(12) United States Patent
Azadet et al.

(10) Patent No.: US 11,989,554 B2
(45) Date of Patent: May 21, 2024

(54) PROCESSING PIPELINE WITH ZERO LOOP OVERHEAD

(71) Applicant: Intel Corporation, Santa Clara, CA (US)

(72) Inventors: Kameran Azadet, San Ramon, CA (US); Jeroen Leijten, Hulsel (NL); Joseph Williams, Holmdel, NJ (US)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 17/131,970

(22) Filed: Dec. 23, 2020

(65) Prior Publication Data

US 2022/0197641 A1 Jun. 23, 2022

(51) Int. Cl.
*G06F 9/38* (2018.01)
*G06F 9/30* (2018.01)
*G06F 9/46* (2006.01)
*G06F 9/54* (2006.01)

(52) U.S. Cl.
CPC ...... *G06F 9/30036* (2013.01); *G06F 9/30079* (2013.01); *G06F 9/3877* (2013.01); *G06F 9/463* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 2008/0155236 A1* | 6/2008 | Wilson | G06F 9/381 |
| | | | 712/241 |
| 2017/0344375 A1* | 11/2017 | Zhu | G06F 9/30065 |
| 2018/0350202 A1* | 12/2018 | Gao | F41G 3/00 |
| 2019/0095209 A1* | 3/2019 | Grant | G06F 9/324 |
| 2020/0213079 A1* | 7/2020 | Kreeger | H04L 9/008 |

* cited by examiner

*Primary Examiner* — Hyun Nam
(74) *Attorney, Agent, or Firm* — Banner & Witcoff Ltd.

(57) ABSTRACT

Techniques are disclosed for reducing or eliminating loop overhead caused by function calls in processors that form part of a pipeline architecture. The processors in the pipeline process data blocks in an iterative fashion, with each processor in the pipeline completing one of several iterations associated with a processing loop for a commonly-executed function. The described techniques leverage the use of message passing for pipelined processors to enable an upstream processor to signal to a downstream processor when processing has been completed, and thus a data block is ready for further processing in accordance with the next loop processing iteration. The described techniques facilitate a zero loop overhead architecture, enable continuous data block processing, and allow the processing pipeline to function indefinitely within the main body of the processing loop associated with the commonly-executed function where efficiency is greatest.

24 Claims, 5 Drawing Sheets

PROCESSING PIPELINE WITH ZERO LOOP OVERHEAD

TECHNICAL FIELD

Aspects described herein generally relate to processing pipelines and, in particular, to techniques for eliminating overhead of function calls and software pipelining present in existing processing pipeline architectures.

BACKGROUND

A vector processor or array processor is a central processing unit (CPU) that implements an instruction set containing instructions that operate on one-dimensional arrays of data referred to as "vectors," This is in contrast to scalar processors having instructions that operate on single data items. Vector processors can greatly improve performance on certain workloads, notably numerical simulation and similar tasks, by utilizing a processing pipeline architecture. However, current implementation of processing pipelines presents various drawbacks.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Vector Processor Operation

Generally speaking, conventional CPUs manipulate one or two pieces of data at a time. For instance, conventional CPUs may receive an instruction that essentially says "add A to B and put the result in C," with 'C' being an address in memory. Typically the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors, which are otherwise known as array processors, take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will repeatedly be executed on another item of data, at an address one increment larger than the last. This allows for significant savings in decoding time.

Figure 1:
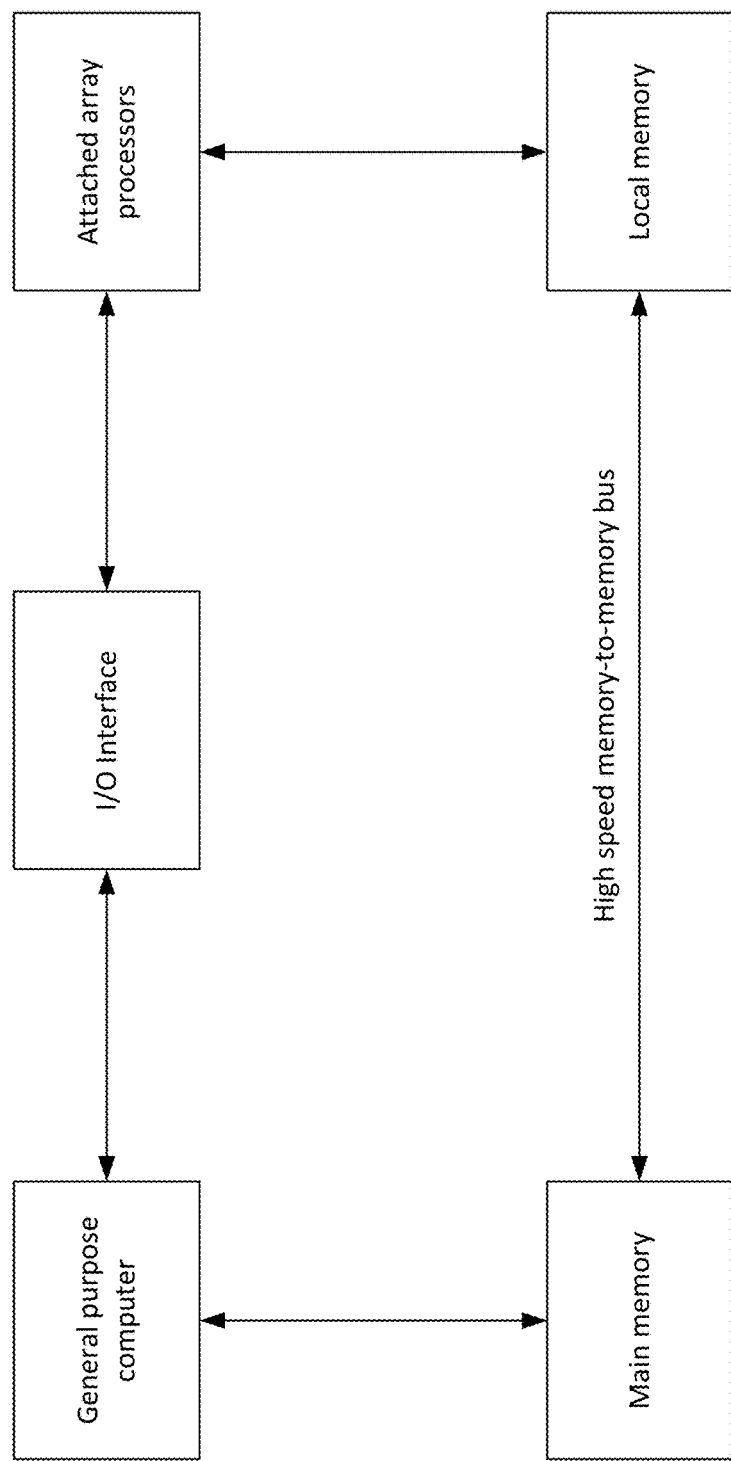
FIG. 1 illustrates an example of a conventional vector processor architecture.
Figure 2:
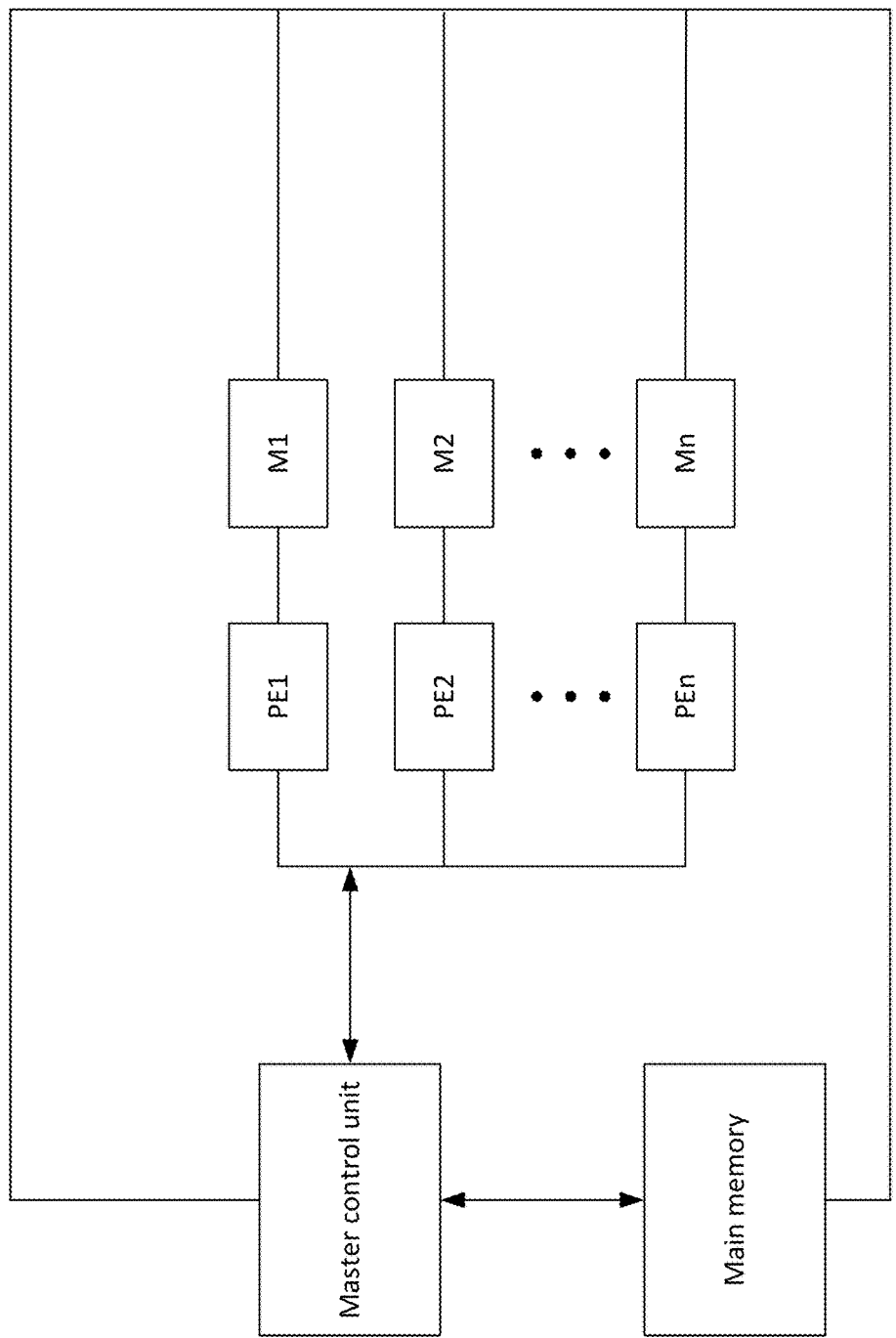
FIG. 2 illustrates another example of a conventional vector processor architecture.

Vector processors may be implemented in accordance with various architectures, and the aspects as further described herein may be implemented in accordance with any of these architectures or combinations of these architectures. By way of example and not limitation, FIGS. 1 and 2 provide two different implementations of a vector processor architecture. FIG. 1 illustrates an attached vector processor, which is attached to a general purpose computer, for instance, for the purpose of enhancing and improving the performance of that computer in numerical computational tasks. The attached vector processor achieves high performance by means of parallel processing with multiple functional units. FIG. 2, on the other hand, shows an example of a single instruction stream, multiple data streams (SIMD) vector processor. The SIMD vector processor has an architecture of a single computer or processor containing multiple processors functioning in parallel. The processing units function under the control of a common control unit, thus providing a single instruction stream and multiple data streams.

Regardless of the particular implementation, vector processors can greatly improve performance on certain workloads but have various drawbacks. For instance, vector processors inherently suffer from inefficiencies due to the overhead of function calls and software pipelining. The aspects described herein address these issues by reducing or completely eliminating such overheads. To do so, and as further discussed below, the aspects described herein aim to reduce or eliminate the processing loop overhead and function call overheads by running the main 'for loop' indefinitely, and using message-passing synchronization between the processing units of the vector processor, which may include functional units such as processors, cores, etc. The aspects described herein may thus achieve close to 100% efficiency, significantly reduce the cost in silicon area (e.g.

the number of cores needed to perform the processing of a certain workload), and may be implemented for any suitable type of system in which pipeline processing may be utilized, such as real-time systems for instance.

Processing Loop Functionality

Although the aspects described herein may be implemented in accordance with a vector processor architecture, such as those discussed with reference to FIGS. 1 and 2 above, for instance, this is by way of example and not limitation. The aspects described herein may be implemented in accordance with any suitable type of processor configuration that utilizes a processing pipeline architecture and/or processes data streams. The processing pipeline aspects described herein may process data within a processing loop for a number of iterations that are executed in accordance with a commonly-executed function. For example, the aspects described herein may be particularly useful when implemented as part of a data streaming architecture in which a pipeline of processors, cores, functional units, etc. are coupled to one another to perform data processing on data blocks in a streaming manner. Thus, a discussion regarding the various function calls that may be utilized in accordance with the aspects as described herein is now provided.

Again, the aspects described herein may be implemented in accordance with any suitable type of application that utilizes pipeline processing to process data in accordance with a commonly-executed function. This commonly-executed function may be any suitable type of function that implements an iterative processing loop, which may include a "for" loop for example. Such functions may be implemented for instance as part of the digital signal processing operations for wireless communications, such as filter tap calculations, digital pre-distortion (DPD) coefficient calculations, average signal measurement calculations over time, digital signal processing of signals transmitted or received via individual antenna data streams for multiple-input-multiple-output (MIMO) antenna systems, etc. As another example, the data blocks discussed herein that are processed in accordance with a processing pipeline may be part of an in-phase (I) quadrature-phase (Q) data stream, which may be processed prior to data transmission of wireless signals or after receiving the wireless signals. Additionally or alternatively, such functions may be implemented as part of graphics processing unit (GPU) to perform graphics processing and/or rendering.

Regardless of the particular implementation or application, the pipeline processing architecture in accordance with the aspects described herein may execute various functions on incoming data streams. These data streams may comprise sequentially-passed data blocks of a particular size or format depending upon the particular application and function that is called. The processors that constitute the processing pipeline then execute a specific called function in accordance with the executable instructions or code in which each processor is programmed or otherwise configured to carry out, with the specific called function typically being one from among a particular function set. For example, if the function is to calculate filter coefficients, then the function may define parameters for a particular frequency, number of taps, a target bandwidth, filter poles and zeroes, etc., such that the calculated result of executing the called function yields the desired filter coefficients.

Figure 3:
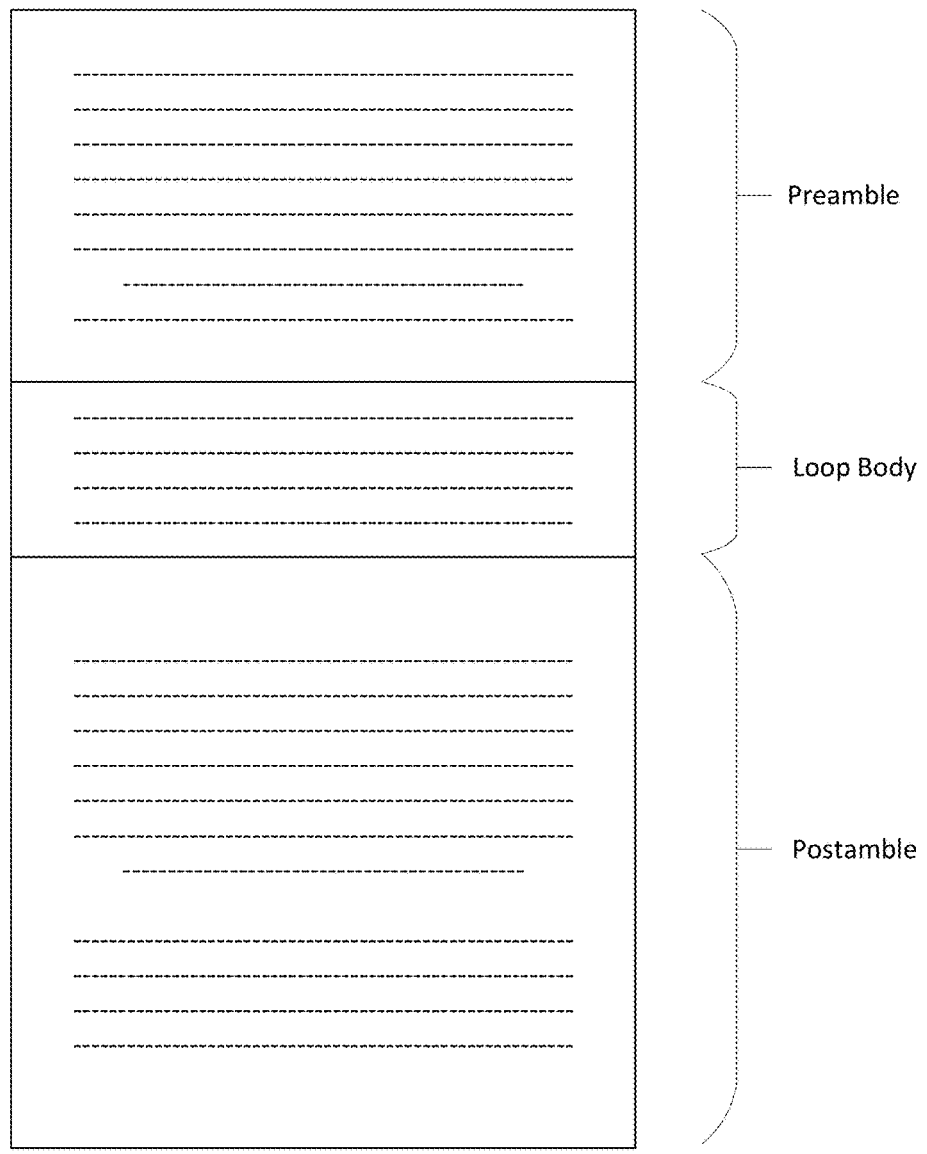
FIG. 3 illustrates an example of a function call architecture for performing iterative loop data processing, in accordance with one or more aspects of the present disclosure.

For example, and with reference to FIG. 3, a called function may have a specific code format including a preamble, a loop body, and a postamble. The preamble may be implemented as a few lines of code at the beginning of a function, which prepares the stack and registers for use within the function. The postamble appears at the end of the function, and restores the stack and registers to the state they were in before the function was called. The main body of the function is shown in FIG. 3 and may include only a loop body or additional code to facilitate multiple iterations (e.g. passes) of data processing in accordance with the type of function that is called. For instance, the loop body may include a "for" loop or other types of loop architectures (e.g. if/then, while, etc.) and define the specific conditions and/or a maximum number of iterations that, until met, instruct the processors within the processing pipeline to continue to iteratively execute the code within the processing loop. For instance, a processing loop may include a constraint related to a threshold value, a minimum error value, etc., such that the function's processing loop will be iteratively executed within the processing pipeline until this condition is met or exceeded.

Because a function call having such an iterative processing loop includes the aforementioned preamble and postamble, these introduce a "loop overhead," as the preamble and postamble are necessary but do not contribute to the actual computation on the data that is performed in the main body (e.g. the processing loop). The loop body as shown in FIG. 3, therefore, is identified with a called function's maximum performance. Thus, as the number of iterations within the data processing loop are increased, the efficiency of the called function is also increased. The efficiency in this context may be defined, for example, as the loop body cycle count for a particular function divided by a total cycle count. In other words, if the number of clock cycles spent within the loop body divided by the total (e.g. cumulative or aggregate) number of clock cycles yields the efficiency for performing a computation using a particular iteratively-executed function. As an illustrative example, the function may be identified with an efficiency of 66% on a first processing iteration, with subsequent processing iterations of 72%, 77%, 80%, 82% . . . which approach 100% efficiency over time with increasing iterations at the cost of a larger data block size. Thus, for an increasing number of iterations, more time is spent in the loop body, thereby increasing efficiency.

Thus, the aspects as described herein advantageously recognize that a processing pipeline that performs a commonly-executed function among each of the processing units within the processing pipeline may initially call the function, and then continue to execute the code in the loop body indefinitely as additional data blocks are received. In other words, the aspects described herein may remain within the data processing loop associated with the function indefinitely to significantly reduce or eliminate loop overhead. This may be referred to herein as an "infinite loop." To do so, the aspects described herein may process streaming data to achieve high efficiency using relatively small data blocks (e.g. 256 samples, 512 samples, 1024 samples, etc.) while minimizing or at least reducing latency associated with conventional processing pipelines. To do so, reference is now made to FIG. 4, which illustrates an example of a functional processing pipeline in accordance with one or more aspects of the present disclosure. To provide an illustrative example, for a block size of 256 samples, a processing pipeline may include 32 vector engines, as further discussed below with reference to FIG. 4. This allows for 32 samples of the 256 data samples to be processed at one time, requiring 8 iterations of the loop. Thus, the number of clock cycles per each loop multiplied by 8 in this example yields a number of clock cycles that are spent doing useful "work"

on the 256 data samples, with the additional clock cycles in excess of this number being contributed to loop overhead (e.g. due to the preamble and postamble processing).

Processing Pipeline Architecture

Figure 4:
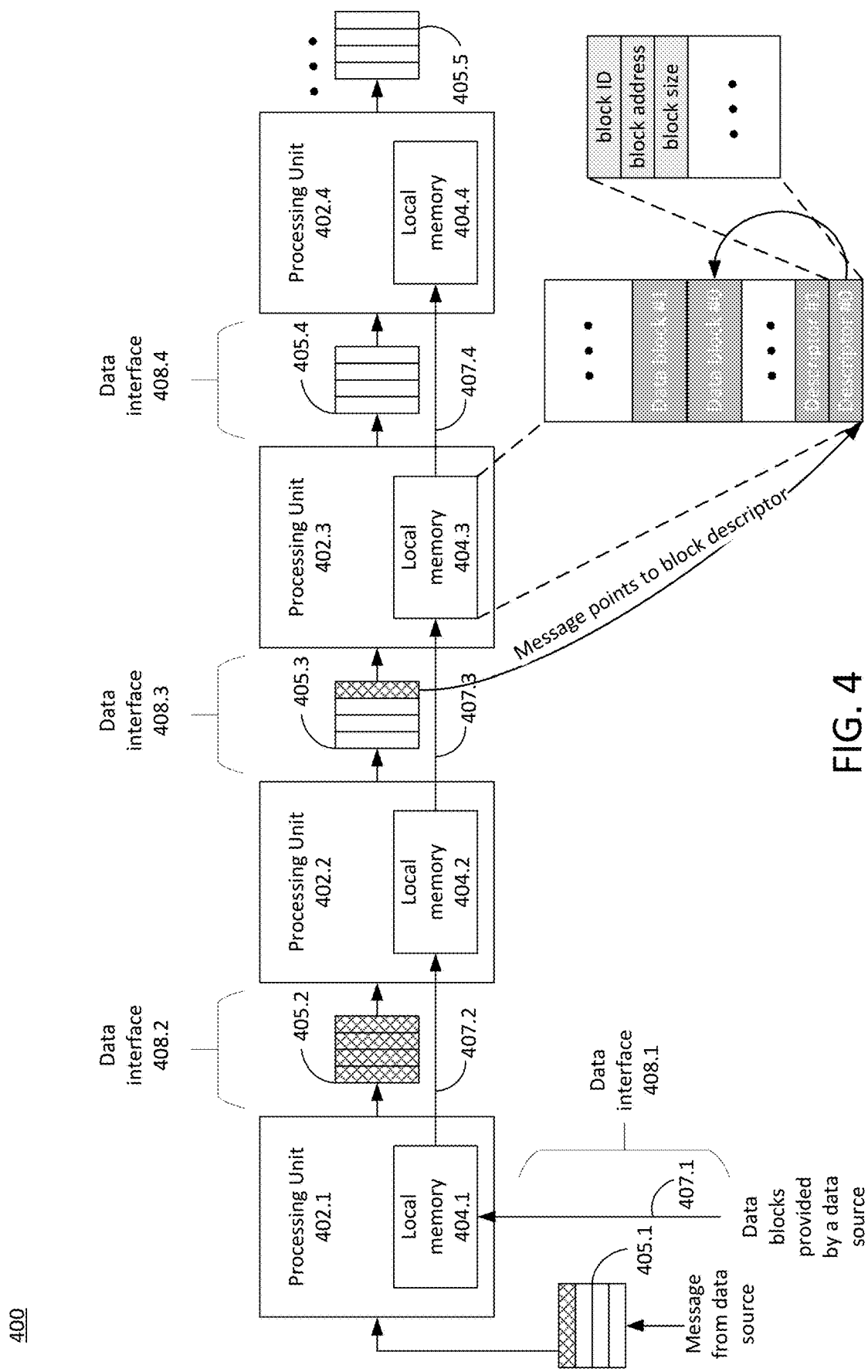
FIG. 4 illustrates an example of a processing pipeline, in accordance with one or more aspects of the present disclosure.

It is noted that the processing pipeline 400 as shown and discussed with reference to FIG. 4 is by way of example and not limitation, and may include additional, alternate, or fewer components than those shown, in various aspects. As shown in FIG. 4, the processing pipeline 400 includes any suitable number of processing units 402, each being configured to process streaming data received in the form of data blocks provided via a data source as shown. The details of the data source are not shown in the Figures for purposes of brevity, but may include any suitable type of data source configured to pass streaming data to the processing pipeline 400 for further processing in accordance with a specifically called function, as further discussed herein. For instance, the data source may be identified with an I/Q data stream in the digital domain, as noted above before transmission of a wireless signal or after receiving a wireless signal that is converted to a digital I/Q data stream, and thus the data source may provide a data stream at a predetermined or fixed bit rate. As another example, one or more additional processors or other components implemented by a communications device, a graphics processing unit, etc.

In any event, each of the processing units 402.1-402.4 is configured to receive and process data blocks received in accordance with a specific function having a data processing loop that is executed over one or more iterations, and to store the result of the data block processing in a respective local memory 404.1-404.4. Although only four processing units 402 are shown in FIG. 4, this is by way of example and not limitation, and aspects include the processing pipeline 400 including any suitable number and/or type of processing units 402 depending upon the particular application and implementation. Regardless of the number of processing units 402, aspects include the processing units 402 being implemented as any suitable type of components configured to execute instructions in accordance with one or more called functions. This may include, for instance, individual processors or processor cores of a larger processor architecture. As additional examples, the processing units 402 may be implemented as processing circuitry including any suitable combination of hardware and software components, as functional units, as programmable hardware components and/or processor engines configured to interpret and execute instructions in accordance with a specifically-called function and/or for any other suitable purpose, etc. In an aspect, the processing units 402 may be implemented in accordance with a vector processing pipeline architecture, for example, in which case the processing units 402.1-402.4 may be implemented as vector engines (VEs) or other suitable processors that may function in accordance with such an architecture for this purpose.

Regardless of the specific implementation of each of the processing units 402, each processing unit 402 may be coupled to (e.g. operatively connected to) one another to form the processing pipeline 400 via a respective data interface 408, with upstream processing units 402 functioning as "producer" processors for the processing units 402 that are downstream in the processing pipeline 400, which function as "consumer" processors. For instance, the processing unit 402.1 may function as a producer processor, which is upstream from the processing unit 402.2 in the processing pipeline 400 as shown by the direction of the arrows in FIG. 4. The processing unit 402.2, in turn, is downstream from the processing unit 402.1, and thus the processing unit 402.2 functions as a consumer processor. In this producer-consumer processor relationship context, each downstream processing unit 402 functions to process data blocks upon completion of the processing of a data block via a processing unit 402 that is upstream from that particular processing unit 402. Thus, an upstream processing unit 402 functions as the producer of data blocks to be consumed by downstream processing units 402 in the processing pipeline 400. This relationship holds true for each processing unit 402 in the processing pipeline 400, with some processing units 402 functioning as both a producer processor and a consumer processor within the processing pipeline 400 (e.g. processing units 402.2, 402.3). Thus, depending upon the particular position of one processing unit 402 within the processing pipeline 400, the processing units 402 may be alternatively referred to herein as an upstream or producer processing unit or as a downstream or consumer processing unit, as the case may be.

In an aspect, each of the processing units 402 may also implement any suitable type of local memory 404.1-404.4. Although illustrated in FIG. 4 as part of each respective processing unit 402, the aspects descried herein are not limited to this particular architecture, and the local memory 404.1-404.4 may alternatively or additionally be implemented external to the processing pipeline 400 and/or the processing units 402. It may be particularly advantageous to implement the local memory 404.1-404.4 as part of each respective processing unit 402, however, to increase the speed of the processing pipeline 400 by avoiding the additional latency associated with accessing external memory. The local memory 404.1-404.4 may be implemented as any suitable type of addressable data storage. For example, the local memory 404 may be implemented as any well-known volatile and/or non-volatile memory, including, for example, random access memory (RAM), read-only memory (ROM), flash memory, a magnetic storage media, an optical disc, erasable programmable read only memory (EPROM), programmable read only memory (PROM), etc. The local memory 404.1-404.4 may be non-removable, removable, or a combination of both. The implementation of RAM memory may be particularly useful, however, as reading and writing to this type of memory may be performed on the order of nanoseconds.

In an aspect, each processing unit 402 is configured to respectively operate on a data block, to process the data block in accordance with one or more iterations of a data processing loop associated with the commonly-executed function performed by the processing pipeline 400, and to store the result of processing the data block in its own local memory 404. A processing unit 402 may process a data block, for example, that is provided by either the data source (e.g. for the processing unit 402.1) or provided by an upstream processing unit 402, which functions as a producer processor in this context. To do so, aspects include each processing unit 402 being configured to execute at least one iteration of the data processing loop on a data block associated with the commonly-executed function, and then store the resulting processed data block in the local memory 404 of the processing unit 402. Furthermore, each directly downstream processing unit 402 may then retrieve the processed data block from the local memory 404 of its adjacent upstream processing unit 402 (e.g. the processing unit 402.2 may retrieve the processed data block form the local memory 404.1 of the processing unit 402.1). This process may then be repeated for each processing unit 402 within the processing pipeline 400. For instance, each processing unit 402 may retrieve a data block that has been processed and stored by an adjacent upstream processing unit 402, and then further process that retrieved data block in accordance with at least one additional iteration of the data processing loop associated with the commonly-executed function. In this way, the processing pipeline 400 may continuously operate within the main loop body of the commonly-executed function, as noted above, with each processing unit 402 executing at least one iteration of the data processing loop.

To facilitate this functionality, aspects include the processing pipeline 400 also implementing any suitable number and/or type of data interfaces 408, with four being shown in FIG. 4 by way of example and not limitation. Each of the data interfaces 408 may be implemented with any suitable number and/or type of data buses, interconnections, wired or wireless links, etc., which couple each of the processing units 402 within the processing pipeline 400 to one another to facilitate the transfer of data downstream. For example, each of the data interfaces 408.1-408.4 may include a data bus 407.2-407.4, which enables the transfer of processed data blocks stored in the local memory 404 of each processing unit 404 to the local memory 404 of the next downstream processing unit 402 in the processing pipeline 400 for further processing, as discussed in further detail herein. The data bus 407.1, in turn, enables the transfer of data blocks from the data source to the first processing unit 402.1 in the processing pipeline 400.

Furthermore, each of the data interfaces 408.1-408.4 may include a buffer 405.1-405.4, which enables the synchronization of data block processing between the different processing units 402 within the processing pipeline 400, as further discussed below. The buffers 405 may be implemented as any suitable type of memory or data buffer, such as a first-in-first out (FIFO) data buffer, for example. The data interfaces 408 may additionally include other components such as any suitable number and/or type of data buses, interconnections, wired or wireless links, etc., to facilitate the transfer of data between each processing unit 402 and a respectively-coupled buffer 405 in both the downstream and upstream directions, as illustrated in FIG. 4 via the arrows coupling the processing units 402 to one another via the buffers 405. The buffer 405.1 is also coupled to a data source that provides a message for the first processing unit 402.1 in the processing pipeline 400, indicating that the processing unit 402.1 may begin processing the data block written to its local memory 404.1 by the data source, as further discussed below. Moreover, although the buffers 405 are illustrated in FIG. 4 as being part of the respective data interfaces 408.1-408.4, this is by way of example and not limitation, and the buffers 405 may alternatively be incorporated as part of a processing unit 402 and/or as part of the local memory 404 implemented via each processing unit 402, in various aspects.

Thus, the data buses 407 function to facilitate the transfer of data between the local memory 404 of each of the processing units 402. Aspects include the processing pipeline 400 implementing a messaging system to indicate to each processing unit 402 when and where data blocks are available from each upstream processing unit 402's local memory 404. In an aspect, each processing unit 402 (and the data source) is configured to generate a message upon completion of the processing of the current data block in accordance with at least one iteration of the data processing loop associated with the commonly-executed function. The generation of this message may be triggered, for example, upon a processing unit 402 storing the resulting processed data block (e.g. after executing at least one iteration of the data processing loop on a data block received from an upstream processing block 402) in its local memory 404.

The message may be alternatively referred to herein as a "token" or a "data token," and may represent data of any suitable size and/or format that indicates, to a downstream processing unit 402, that there is a processed data block stored in the local memory 404 of an upstream processing unit 402. For example, the message may include one or more data flags (e.g. one or more bits with a binary indication of whether a processed data block is ready) and may optionally include other information such as an indication of an address location of the stored processed data block in the local memory 404 of the upstream processing unit 402, for example. Additionally, the message may include any other suitable types of data such as a timestamp, the size of the processed data block, the number of iterations of the data processing loop performed to obtain the processed data block, etc.

Thus, in various aspects, the data tokens that are sent to the downstream processing units 402 may contain any suitable type of data having any suitable type of format depending upon the particular implementation and application of the processing pipeline 400. For instance, and as noted above, the data token may be a binary indicator or flag indicating when a processed data block is ready and stored in the local memory 404 of an upstream processing unit 402, and ready to be transferred to the downstream processing unit 402. Additionally or alternatively, the data token may function as a pointer to a specific address in the local memory 404 of the downstream processing unit 402. For example, the data token may include data identifying a resolution (e.g. number of bits), a block identifier, a location of the data block (address) in the local memory 404, a data block size the data block (e.g. in bits), etc. In various aspects, the data tokens may function to explicitly transmit this data to the downstream processing unit 402, and in such a case this information may be stored in the appropriate buffer 405 via the upstream processing unit 402 upon completion of the data block processing.

Alternatively, the data token may function as a pointer to a block descriptor stored in the local memory 404 of the downstream processing unit 402 (or the local memory 404 of any other processing unit 402, including upstream or downstream processing units 402, depending upon the particular implementation, e.g. the processed data blocks being "pushed" downstream into local memory 404 of downstream processing units 402 or being retrieved upstream from the local memory 404 of upstream processing units 402, as the case may be), as shown in further detail in FIG. 4. The descriptor stored in the local memory 404.3 of the processing unit 402.3 (in this example) may thus contain any suitable type of information as noted above that may be identified with the explicit transmission of this data via the data token (e.g. the block ID, block address in the local memory 404.3, the block size, etc.). In this way, the data tokens may be passed downstream to provide information to the downstream processing units 402 with respect to not only when the upstream processing units 402 have completed processing their respective data blocks, but additional information regarding where the data blocks can then be found in the local memory of the downstream processing unit 402 (and/or upstream processing units 402), the data block size, a block identification, etc.

Thus, aspects include a processing unit 402, upon storing the processed data block in its local memory 404, transmitting the message downstream to the next processing unit 402. The transmission of this message may be performed, for instance, by storing the message in a register of a respectively coupled buffer 405, which again may be implemented as a FIFO buffer, for instance. Thus, transmitting the message in this way (e.g. storing the message in a downstream buffer 405) notifies a downstream processing unit 402 that a task is ready for processing, i.e. that the upstream processing unit 402 has completed processing of a data block, which is stored it its local memory 404 and ready for further processing. The downstream processing unit 402 may then receive the message transmitted by the upstream data processing unit 402 by retrieving, accessing, or otherwise receiving the data stored in the buffer 405. Upon doing so (e.g. in response to the message being received), the downstream processing unit 402 may then retrieve the processed data block from the local memory 404 of the upstream processing unit 402. In an aspect, the downstream processing unit 402 may read and then remove the message from the buffer 405 prior to further processing the processed data block in accordance with at least one subsequent iteration of the data processing loop associated with the commonly-executed function, as further discussed below. Doing so frees up the contents of the buffer 405 for additional messages to be stored by the upstream processing unit 402 as the upstream processing unit 402 processes and stores additional data blocks in its local memory 404.

Once retrieved from the local memory 404 of an upstream processing unit 402 (e.g. local memory 404.1 of the processing unit 402.1), a downstream processing unit 402 (e.g. processing unit 402.2) may continue processing the processed data block by executing at least one subsequent iteration of the data processing loop associated with the commonly-executed function. The downstream processing unit 402 (e.g. processing unit 402.2) may then store the result of doing so in its local memory 404 (e.g. local memory 404.2) as a further processed data block. The downstream processing unit 402 may then repeat this process of transmitting a message to the next downstream processor 402 via the coupled buffer 405, and the next downstream processor 402 may retrieve the further processed data block, execute at least one subsequent iteration of the data processing loop associated with the commonly-executed function, store the result of the processing operation, and so on, until the end of the processing pipeline 400 is reached. In this way, the aspects described herein leverage the use of message signaling between the processing units 402 to ensure synchronization of the data processing loop calculations.

Again, aspects include each processing unit 402 within the processing pipeline 400 being configured to execute at least one iteration of the data processing loop associated with the commonly-executed function. As an example, each data processing unit 402 may be configured to execute a single iteration of the data processing loop and, upon doing so, store the result to the local memory 404 associated with that respective data processing unit 402. Continuing this example, the processing pipeline 400 may include a number N of processing units 402.1-402.N that are desired in accordance with a desired accuracy or efficiency depending upon the particular application or implementation, bearing in mind the size of the data blocks that are processed in each iteration and the increased efficiency gained over a number of iterations as noted above. For instance, the number N or processing units 402.1-402.N may be 10, 50, 100, etc. In accordance with such implementations, the processed data block stored in the local memory 404 of the final downstream processing unit within the processing pipeline 400 may represent the completion of all iterations for the data processing loop associated with the commonly-executed function.

Aspects include the processing units 402 continuously executing their respective processing loop iterations (which may be one or more iterations per processing unit 402) as additional data blocks are streamed without interrupting or otherwise halting the data processing loop (e.g. iteratively executing the respective processing loop iterations in an uninterrupted fashion). Thus, the processing units 402 may process data blocks sequentially as the data blocks are passed downstream through the processing pipeline 400 without interrupting execution of any of the plurality of iterative data processing loops associated with the commonly-executed function. In this way, the processing units 402 within the processing pipeline 400 may execute the commonly-executed function in accordance with zero loop overhead by maintaining data processing within the loop body of the called function, thereby maximizing efficiency in doing so.

In other words, because each processing unit 402 is configured to store processed data blocks in its respective local memory 404 for further processing by downstream processing units 402 in the processing pipeline 400, aspects include the downstream processing units 402 retrieving processed data blocks from the upstream processing units 402 while the upstream processing unit 402 processes new data blocks in the data stream. In this way, an upstream processing unit 402 may process data blocks from the data source or from another upstream processing unit 402 concurrently with the transfer (e.g. retrieval from an upstream processing unit's local memory 404) of the processed data blocks by the next downstream processing unit 402 for further processing in accordance with one or more subsequent iterations in the data processing loop. That is, each downstream processing unit 402 within the processing pipeline 400 is configured to receive the processed data block from an upstream processing unit 402 via a respective data interface 408 concurrently with the upstream processor executing the data processing loop on another (different) data block in accordance with one or more further data processing loop iterations.

Again, the use of a messaging system to indicate when processed data blocks are stored in the local memory 404 of a processing unit 402 facilitates a synchronization of data processing within the processing pipeline 400. This may be particularly useful, for instance, when some of the processing units 402 execute instructions or otherwise run faster than others, or when the speed of the data block processing may otherwise vary between the processing units 402. For example, the data source coupled to the processing pipeline 400 may provide data at a fixed, predetermined rate or at a variable, dynamic rate in accordance with a particular communication protocol, sampling rate, etc. However, each processing unit 402 may operate faster or slower than one another, and thus an upstream processing unit 402 may store more than one processed data block in its local memory 404 as a data queue for further processing by a downstream processing unit 402, as there may be a delay between when the upstream processing unit 402 has completed the processing of a data block and when the next downstream processing unit 402 is ready to process the next data block.

Thus, aspects include the use of the buffers 405 to enable an upstream processing unit 402 to transmit multiple messages to the next downstream processing unit 402 in the processing pipeline 400 by storing a separate message in each register of the coupled buffer 405. Each separate message indicates a separate data block processing task to be performed by the downstream processing unit 402, and the location of each processed data block to be retrieved from the local memory 404 of the upstream processing unit 402. In this way, the messages stored in the buffers 405 may function to arbitrate the flow of data processing through the processing pipeline 400, allowing the processing pipeline 400 to withstand jitter.

For example, and with continued reference to FIG. 4, the buffer 405.4 is empty, indicating that no processed data blocks are stored in the local memory 404.3 of the upstream processing unit 402.3, and thus no tasks are currently scheduled for processing by the downstream processing unit 402.4. However, the buffer 405.3 is not empty, as it includes a stored message as denoted by the shaded block in FIG. 4, which indicates that the upstream processing unit 402.2 has stored a processed data block in its local memory 404.2 and thus this processing task is scheduled for the downstream processing unit 402.3.

Furthermore, the buffer 405.2 in the example shown in FIG. 4 is full of messages, indicating that the queue of processed data blocks stored in the local memory 404.1 of the upstream processing unit 402.1 is currently full. In this state, the full buffer 405.2 indicates that the maximum number of tasks that can be scheduled for the downstream processing unit 402.2 has been reached, and the upstream processing unit 402.1 is now overloaded. This state may be identified with a stall in the processing pipeline 400 and, in particular with the processing unit 402.1. Such stalls are preferably avoided to maintain the flow of data through the processing pipeline 400. Because such stalls may present an issue for real-time processing system applications, such as digital front ends (DFEs) and/or radio signal processing applications, for example, aspects include the processing pipeline 400 detecting such stall conditions and generating an error condition message to relevant system components when detected. This may include, for instance, each processing unit 402 being configured to detect when its respectively coupled upstream buffer 405 (which again may be integrated as part of the processing unit 402) is full for a period of time exceeding a predetermined threshold, which may be based upon a number of clock cycles for example. The connections to facilitate the transmission of such an error condition message are not shown in the Figures for purposes of brevity, but may include any suitable number of wired and/or wireless links, with the error condition message containing any suitable type of information regarding the current stall condition such as time stamps, an identification of the location of the buffer 405 within the processing pipeline that is full, etc.

In other words, the use of messages enables flow control of data through the processing pipeline 400. An example code snippet that may be implemented by a processing unit 402 within the processing pipeline 400 is shown below, which utilizes the state of a coupled buffer 405 and the messages (referred to as tokens) stored in the coupled buffer 405 to perform a synchronization of a zero overhead loop within the processing pipeline 400, as discussed herein.

```
void process_task(void)
{
// A token is received for each task to be processed
// Each task processes one iteration of a block of data
int token;
// task loop initialization
...
// processor stalls while waiting for token from circular buffer
// One task iteration is initiated when token arrives
while(token := get_token( );) { // wait until queue in non-empty
// The token can point to parameters specific to each iteration
GET_PARAMS( &token );
// load block of data, compute, and store results.
...
LOAD_INPUT( );
COMPUTE_TASK( );
STORE_RESULT( );
...
// signal to downstream processor that output block is ready
send_token( ); // Next processor reads directly from local memory
// process blocks in loop indefinitely
}
```

Thus, aspects include the data processing units 402 continuing to iteratively process data blocks without exiting the loop function as additional processed data blocks are received from upstream processing units 402.

The processing pipeline 400 may be implemented to process data blocks in accordance with a single data stream or multiple data streams. For example, the data buses 407.2-407.4 may represent any suitable number of links configured to carry multiple data streams in parallel with one another, which may include data blocks to be processed in parallel by each of the processing units 402. Thus, the aspects as described herein may be expanded to include multiple data streams that are streamed from the data source, and each data stream may be associated with a different set of data blocks (e.g. different and distinct data streams) to be sent through the processing pipeline 400, obviating the need to perform a new function call as new data is received for each of these multiple data streams. This is possible because each of the processing units 402 is dedicated to executing the same commonly-executed function regardless of the type of data.

To differentiate between the data blocks to be processed for each of the different sets of data streams, aspects include the upstream processing units 402 within the processing pipeline 400 transmitting or otherwise storing an appropriate data token in the a respective buffer 405 that provides information to the next downstream processing unit 402 regarding a location, address in local memory 404, a block ID, etc., as discussed above with respect to the structure and type of content a data token may contain or otherwise convey. In this way, the data token may enable the downstream processing unit 402 to retrieve and process the correct data block for the corresponding data stream as other data blocks associated with other data streams are also processed in parallel. Thus, the data token or messaging system described herein may be adapted or modified in any suitable manner to support synchronization of the processing pipeline 400 for any suitable number of digital data streams, which may be processed in parallel (e.g. concurrently) with one another.

Example Device Implementing a Processing Pipeline

Figure 5:
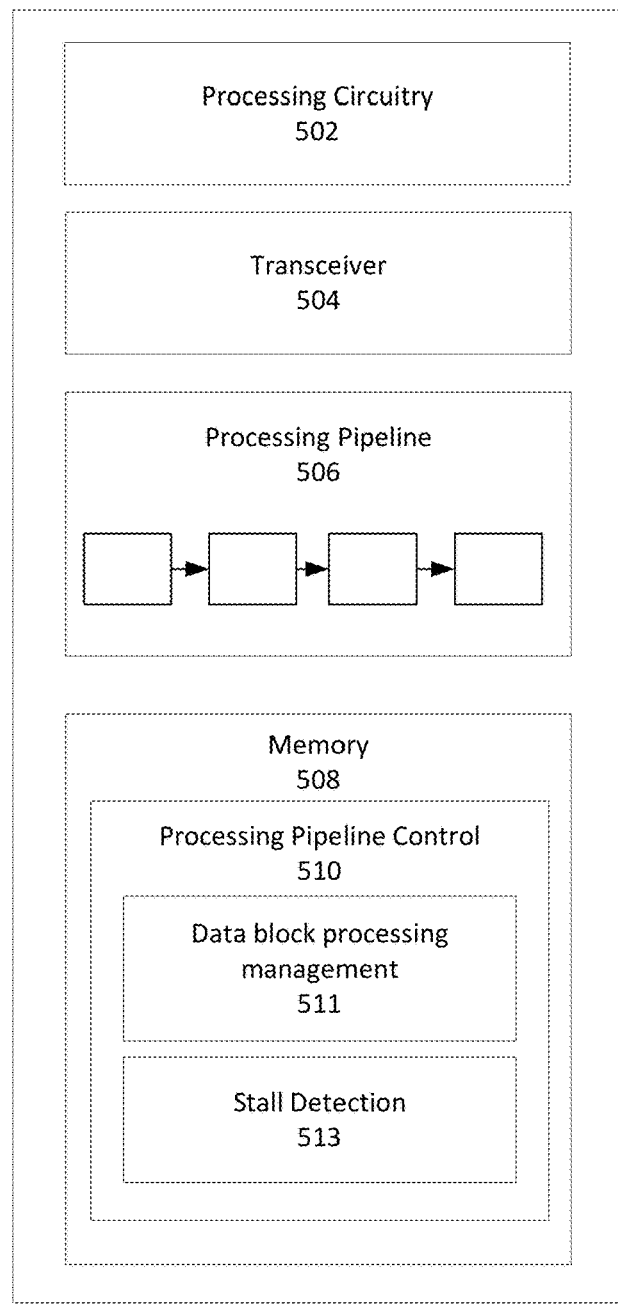
FIG. 5 illustrates an example device, in accordance with one or more aspects of the present disclosure.

FIG. 5 illustrates an example device, in accordance with one or more aspects of the present disclosure. The device 500 may be identified with one or more devices implementing a processing pipeline to perform data block calculations, such as the processing pipeline 400 as shown and discussed herein with reference to FIG. 4 for instance. For example, the device 500 may be identified with a user equipment (UE) or other suitable device configured to perform wireless communications such as a mobile phone, a laptop computer, a tablet, etc., which may include one or more components configured to transmit and receive radio signals, to perform digital signal processing, filter processing, DFE processing, etc. As another example, the device 500 may be identified with a graphics processing unit (GPU), which may perform graphic processing on streams of graphical data.

As further discussed below, the device 500 may perform the aspects as discussed herein with respect to the processing pipeline 400 as shown and discussed with respect to FIG. 4 to perform data block processing operations in accordance with several data processing loop iterations. To do so, the device 500 may include processing circuitry 502, a transceiver 504, a processing pipeline 506, and a memory 508. The components shown in FIG. 5 are provided for ease of explanation, and aspects include the device 500 implementing additional, less, or alternative components as those shown in FIG. 5. For example, the transceiver 504 may be omitted when the device 500 is implemented as a GPU.

In various aspects, the processing circuitry 502 may be configured as any suitable number and/or type of computer processors, which may function to control the device 500 and/or other components of the device 500. The processing circuitry 502 may be identified with one or more processors (or suitable portions thereof) implemented by the device 500. For example, the processing circuitry 502 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, aspects include the processing circuitry 502 being configured to carry out instructions to perform arithmetical, logical, and/or input/output (I/O) operations, and/or to control the operation of one or more components of device 500 to perform various functions associated with the aspects as described herein. For example, the processing circuitry 502 may include one or more microprocessor cores, memory registers, buffers, clocks, etc., and may generate electronic control signals associated with the components of the device 500 to control and/or modify the operation of these components. For example, aspects include the processing circuitry 502 communicating with and/or controlling functions associated with the transceiver 504, the processing pipeline 506, and/or the memory 508.

In an aspect, the transceiver 504 (when present) may be implemented as any suitable number and/or type of components configured to transmit and/or receive data packets and/or wireless signals in accordance with any suitable number and/or type of communication protocols. The transceiver 504 may include any suitable type of components to facilitate this functionality, including components associated with known transceiver, transmitter, and/or receiver operation, configurations, and implementations. Although depicted in FIG. 5 as a transceiver, the transceiver 504 may include any suitable number of transmitters, receivers, or combinations of these that may be integrated into a single transceiver or as multiple transceivers or transceiver modules. For example, the transceiver 504 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. Thus, the transceiver 504 may be configured as any suitable number and/or type of components configured to facilitate receiving and/or transmitting data and/or signals in accordance with one or more communication protocols. For example, the transceiver 504 may be implemented as any suitable number and/or type of components to support wireless communications such as analog-to-digital converters (ADCs), digital to analog converters, intermediate frequency (IF) amplifiers and/or filters, modulators, demodulators, baseband processors, etc. The data received via the transceiver 504 (e.g. wireless signal data streams), data provided to the transceiver 504 for transmission (e.g. data streams for transmission), and/or data used in conjunction with the transmission and/or reception of data via the transceiver 504 (e.g. digital filter coefficients) may be processed as data blocks via the processing pipeline 506, as discussed herein, in various aspects. Thus, the processing pipeline 506 may be identified with the processing pipeline 400 as shown and described herein with reference to FIG. 4.

In an aspect, the memory 508 stores data and/or instructions such that, when the instructions are executed by the processing circuitry 502, cause the device 500 to perform various functions as described herein with respect to the processing pipeline 506, such as controlling, monitoring, and/or regulating the flow of data through the processing pipeline 506, for instance. The memory 508 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 508 may be non-removable, removable, or a combination of both. For example, the memory 508 may be implemented as a non-transitory computer readable medium storing one or more executable instructions such as, for example, logic, algorithms, code, etc.

As further discussed below, the instructions, logic, code, etc., stored in the memory 508 are represented by the various modules as shown in FIG. 5, which may enable the aspects disclosed herein to be functionally realized. Alternatively, the modules shown in FIG. 5 associated with the memory 508 may include instructions and/or code to facilitate control and/or monitor the operation of hardware components implemented via the device 500 (e.g. the processing pipeline 506). In other words, the modules shown in FIG. 5 are provided for ease of explanation regarding the functional association between hardware and software components. Thus, aspects include the processing circuitry 502 executing the instructions stored in these respective modules in conjunction with one or more hardware components to perform the various functions associated with the aspects as further discussed herein.

The processing pipeline control engine 510 may represent the functionality described herein as discussed with reference to controlling and/or monitoring the processing pipeline 506. In an aspect, the executable instructions stored in the data block processing management module 511 may facilitate, in conjunction with execution via the processing circuitry 502, the device 500 providing data blocks to the processing pipeline 506 (e.g. from a suitable data source as discussed herein). This may include, for instance, a determination of a size of a data block to provide to the processing pipeline, a timing of data blocks to be provided to the processing pipeline 506 as part of a data stream, sending messages to the first processing unit in the processing pipeline 506 (e.g. by storing messages in the buffer 405.1), storing data blocks in the local memory of the first processing unit in the processing pipeline 506, etc. This may also include, for example, retrieving a result of one or more of the processing units 402 included in the processing pipeline 506 after performing a number of processing loop iterations on data blocks, which may then be used for any suitable purpose depending upon the particular application and implementation of the device 500.

In an aspect, the executable instructions stored in the stall detection module 513 may facilitate, in conjunction with execution via the processing circuitry 502, the determination of a stall in the processing pipeline 506 based upon the status of one or more buffers, as discussed herein. As another example, the executable instructions stored in the stall detection module 513 may facilitate, in conjunction with execution via the processing circuitry 502, the calculation, generation, and/or transmission of an error condition message to other components implemented by the device 500 or other components external to the device 500, to indicate the presence and/or nature of a stall in the processing pipeline 506 once detected.

EXAMPLES

The following examples pertain to further aspects.

Example 1 is a processing pipeline, comprising: a first processor including a first memory; and a second processor including a second memory, the second processor being operably connected to the first processor via a data interface and being downstream from the first processor in the processing pipeline, wherein the first processor and the second processor are configured to process data blocks in accordance with a plurality of data processing loop iterations associated with a commonly-executed function, wherein the first processor is configured to process a data block in accordance with a first one of the plurality of data processing loop iterations to provide a processed data block, to store the processed data block in the first memory, and to transmit a message to the second processor indicating that the processed data block has been stored in the first memory, wherein the second processor is configured to, in response to the received message, process the processed data block in accordance with a second one of the plurality of data processing loop iterations and to store a result of processing the processed data block in the second memory, and wherein the first processor and the second processor are each configured to process the data block and the processed data block, respectively, as part of an uninterrupted execution of the first and the second ones of the plurality of data processing loop iterations associated with the commonly-executed function In Example 2, the subject matter of Example 1, wherein the second processor is configured to receive the processed data block from the first processor via the data interface while the first processor processes another data block in accordance with a third one of the plurality of data processing loop iterations.

In Example 3, the subject matter of any combination of Examples 1-2, wherein the first processor is configured to process the data block in accordance with the first one of the plurality of data processing loop iterations with zero loop overhead, and wherein the second processor is configured to process the processed data block in accordance with the second one of the plurality of data processing loop iterations with zero loop overhead.

In Example 4, the subject matter of any combination of Examples 1-3, wherein the first processor and the second processor are each configured to process respective data blocks in accordance with the plurality of data processing loop iterations without exiting a loop body associated with the commonly-executed function.

In Example 5, the subject matter of any combination of Examples 1-4, wherein the message includes an address of the processed data block stored in the first memory of the first processor.

In Example 6, the subject matter of any combination of Examples 1-5, wherein the second processor is configured to receive the processed data block from the first processor via the data interface by retrieving the processed data block from the first memory of the first processor.

In Example 7, the subject matter of any combination of Examples 1-6, wherein: the data interface includes a first-in-first-out (FIFO) buffer, the first processor is configured to transmit the message to the second processor indicating that the processing of the data block is completed by storing the message in the FIFO buffer, and the second processor is configured to receive the message transmitted by the first processor by retrieving the message from the FIFO buffer.

In Example 8, the subject matter of any combination of Examples 1-7, wherein the second processor is configured to read the message from the FIFO buffer and to remove the message from the FIFO buffer prior to processing the processed data block in accordance with the second one of the plurality of data processing loop iterations.

Example 9 is a processing pipeline, comprising: a data interface; and a plurality of processors operably connected to one another and configured to process data blocks in accordance with a plurality of data processing loop iterations associated with a commonly-executed function, the plurality of processors including a producer processor and a consumer processor, the producer processor being configured to provide, via the data interface, data to the consumer processor that is downstream from the producer processor with respect to the processing pipeline, wherein the producer processor is configured to process a data block in accordance with a first one of the plurality of data processing loop iterations to provide a processed data block, to store the processed data block in a first memory, and to transmit a message to the consumer processor indicating that the processed data block has been stored in the first memory, wherein the consumer processor is configured to, in response to the received message, process the processed data block in accordance with a second one of the plurality of data processing loop iterations and to store a result of processing the processed data block in a second memory, wherein the producer processor and the consumer processor are each configured to process the data block and the processed data block, respectively, as part of an uninterrupted execution of the first and the second ones of the plurality of data processing loop iterations associated with the commonly-executed function.

In Example 10, the subject matter of Example 9, wherein the consumer processor is configured to receive the processed data block from the producer processor via the data interface while the producer processor processes another data block in accordance with a third one of the plurality of data processing loop iterations.

In Example 11, the subject matter of any combination of Examples 9-10, wherein the producer processor is configured to process the data block in accordance with the first one of the plurality of data processing loop iterations with zero loop overhead, and wherein the consumer processor is configured to process the processed data block in accordance with the second one of the plurality of data processing loop iterations with zero loop overhead.

In Example 12, the subject matter of any combination of Examples 9-11, wherein the producer processor and the consumer processor are each configured to process respective data blocks in accordance with the plurality of data processing loop iterations without exiting a loop body associated with the commonly-executed function.

In Example 13, the subject matter of any combination of Examples 9-12, wherein the message includes an address of the processed data block stored in the first memory of the producer processor.

In Example 14, the subject matter of any combination of Examples 9-13, wherein the consumer processor is configured to receive the processed data block from the producer processor via the data interface by retrieving the processed data block from the first memory of the producer processor.

In Example 15, the subject matter of any combination of Examples 9-14, wherein: the data interface includes a first-in-first-out (FIFO) buffer, the producer processor is configured to transmit the message to the consumer processor indicating that the processing of the data block is completed by storing the message in the FIFO buffer, and the consumer processor is configured to receive the message transmitted by the producer processor by retrieving the message from the FIFO buffer.

In Example 16, the subject matter of any combination of Examples 9-15, wherein the consumer processor is configured to read the message from the FIFO buffer and to remove the message from the FIFO buffer prior to processing the processed data block in accordance with the second one of the plurality of data processing loop iterations Example 17 is a processing pipeline, comprising: an upstream processor including a first memory; and a downstream processor including a second memory, the upstream processor and the downstream processor each being operably connected to a first-in-first-out (FIFO) buffer; wherein the upstream processor and the downstream processor are configured to process data blocks in accordance with a plurality of data processing loop iterations associated with a commonly-executed function, wherein the upstream processor is configured to process a data block in accordance with a first one of the plurality of data processing loop iterations to provide a processed data block, to store the processed data block in the first memory, and to transmit a message to the downstream processor indicating that the processing of the processed data block has been completed, wherein the downstream processor is configured to, in response to the received message, process the processed data block in accordance with a second one of the plurality of data processing loop iterations and to store a result of processing the processed data block in the second memory, and wherein the upstream processor and the downstream processor are each configured to process the data block and the processed data block, respectively, as part of an uninterrupted execution of the first and the second ones of the plurality of data processing loop iterations associated with the commonly-executed function.

In Example 18, the subject matter of Example 17, wherein the downstream processor is configured to receive the processed data block from the upstream processor via the data interface while the upstream processor processes another data block in accordance with a third one of the plurality of data processing loop iterations.

In Example 19, the subject matter of any combination of Examples 17-18, wherein the upstream processor is configured to process the data block in accordance with the first one of the plurality of data processing loop iterations with zero loop overhead, and wherein the downstream processor is configured to process the processed data block in accordance with the second one of the plurality of data processing loop iterations with zero loop overhead.

In Example 20, the subject matter of any combination of Examples 17-19, wherein the upstream processor and the downstream processor are each configured to process respective data blocks in accordance with the plurality of data processing loop iterations without exiting a loop body associated with the commonly-executed function.

In Example 21, the subject matter of any combination of Examples 17-20, wherein the message includes an address of the processed data block stored in the first memory of the upstream processor.

In Example 22, the subject matter of any combination of Examples 17-21, wherein the downstream processor is configured to receive the processed data block from the upstream processor via the data interface by retrieving the processed data block from the first memory of the upstream processor.

In Example 23, the subject matter of any combination of Examples 17-22, wherein: the upstream processor is configured to transmit the message to the downstream processor indicating that the processing of the data block is completed by storing the message in the FIFO buffer, and the downstream processor is configured to receive the message transmitted by the upstream processor by retrieving the message from the FIFO buffer.

In Example 24, the subject matter of any combination of Examples 17-23, wherein the downstream processor is configured to read the message from the FIFO buffer and to remove the message from the FIFO buffer prior to processing the processed data block in accordance with the second one of the plurality of data processing loop iterations.

Example 25 is a processing pipeline, comprising: a first processor means including a first memory; and a second processor means including a second memory, the second processor means being operably connected to the first processor means via a data interface means and being downstream from the first processor means in the processing pipeline, wherein the first processor means and the second processor means processes data blocks in accordance with a plurality of data processing loop iterations associated with a commonly-executed function, wherein the first processor means processes a data block in accordance with a first one of the plurality of data processing loop iterations to provide a processed data block, stores the processed data block in the first memory, and transmits a message to the second processor means indicating that the processed data block has been stored in the first memory, wherein the second processor means, in response to the received message, processes the processed data block in accordance with a second one of the plurality of data processing loop iterations and stores a result of processing the processed data block in the second memory, and wherein the first processor means and the second processor means each process the data block and the processed data block, respectively, as part of an uninterrupted execution of the first and the second ones of the plurality of data processing loop iterations associated with the commonly-executed function In Example 26, the subject matter of Example 25, wherein the second processor means receives the processed data block from the first processor via the data interface means while the first processor means processes another data block in accordance with a third one of the plurality of data processing loop iterations.

In Example 27, the subject matter of any combination of Examples 25-26, wherein the first processor means processes the data block in accordance with the first one of the plurality of data processing loop iterations with zero loop overhead, and wherein the second processor means processes the processed data block in accordance with the second one of the plurality of data processing loop iterations with zero loop overhead.

In Example 28, the subject matter of any combination of Examples 25-27, wherein the first processor means and the second processor means each process respective data blocks in accordance with the plurality of data processing loop iterations without exiting a loop body associated with the commonly-executed function.

In Example 29, the subject matter of any combination of Examples 25-28, wherein the message includes an address of the processed data block stored in the first memory of the first processor means.

In Example 30, the subject matter of any combination of Examples 25-29, wherein the second processor means receives the processed data block from the first processor means via the data interface by retrieving the processed data block from the first memory of the first processor.

In Example 31, the subject matter of any combination of Examples 25-30, wherein: the data interface means includes a first-in-first-out (FIFO) buffer, the first processor means transmits the message to the second processor indicating that the processing of the data block is completed by storing the message in the FIFO buffer, and the second processor means receives the message transmitted by the first processor by retrieving the message from the FIFO buffer.

In Example 32, the subject matter of any combination of Examples 25-31, wherein the second processor means reads the message from the FIFO buffer and removes the message from the FIFO buffer prior to processing the processed data block in accordance with the second one of the plurality of data processing loop iterations.

Example 33 is a processing pipeline, comprising: a data interface means; and a plurality of processor means operably connected to one another and configured to process data blocks in accordance with a plurality of data processing loop iterations associated with a commonly-executed function, the plurality of processor means including a producer processor means and a consumer processor means, the producer processor means providing, via the data interface means, data to the consumer processor means that is downstream from the producer processor means with respect to the processing pipeline, wherein the producer processor means processes a data block in accordance with a first one of the plurality of data processing loop iterations to provide a processed data block, stores the processed data block in a first memory, and transmits a message to the consumer processor means indicating that the processed data block has been stored in the first memory, wherein the consumer processor means, in response to the received message, processes the processed data block in accordance with a second one of the plurality of data processing loop iterations and stores a result of processing the processed data block in a second memory, wherein the producer processor means and the consumer processor means each process the data block and the processed data block, respectively, as part of an uninterrupted execution of the first and the second ones of the plurality of data processing loop iterations associated with the commonly-executed function.

In Example 34, the subject matter of Example 33, wherein the consumer processor means receives the processed data block from the producer processor via the data interface while the producer processor means processes another data block in accordance with a third one of the plurality of data processing loop iterations.

In Example 35, the subject matter of any combination of Examples 33-34, wherein the producer processor means processes the data block in accordance with the first one of the plurality of data processing loop iterations with zero loop overhead, and wherein the consumer processor means processes the processed data block in accordance with the second one of the plurality of data processing loop iterations with zero loop overhead.

In Example 36, the subject matter of any combination of Examples 33-35, wherein the producer processor means and the consumer processor means each process respective data blocks in accordance with the plurality of data processing loop iterations without exiting a loop body associated with the commonly-executed function.

In Example 37, the subject matter of any combination of Examples 33-36, wherein the message includes an address of the processed data block stored in the first memory of the producer processor.

In Example 38, the subject matter of any combination of Examples 33-37, wherein the consumer processor means receives the processed data block from the producer processor via the data interface by retrieving the processed data block from the first memory of the producer processor.

In Example 39, the subject matter of any combination of Examples 33-38, wherein: the data interface means includes a first-in-first-out (FIFO) buffer, the producer processor means transmitting the message to the consumer processor means indicating that the processing of the data block is completed by storing the message in the FIFO buffer, and the consumer processor means receives the message transmitted by the producer processor by retrieving the message from the FIFO buffer.

In Example 40, the subject matter of any combination of Examples 33-39, wherein the consumer processor means reads the message from the FIFO buffer and removes the message from the FIFO buffer prior to processing the processed data block in accordance with the second one of the plurality of data processing loop iterations Example 41 is a processing pipeline, comprising: an upstream processor means including a first memory; and a downstream processor means including a second memory, the upstream processor means and the downstream processor each being operably connected to a first-in-first-out (FIFO) buffer; wherein the upstream processor means and the downstream processor means process data blocks in accordance with a plurality of data processing loop iterations associated with a commonly-executed function, wherein the upstream processor means processes a data block in accordance with a first one of the plurality of data processing loop iterations to provide a processed data block, stores the processed data block in the first memory, and transmits a message to the downstream processor indicating that the processing of the processed data block has been completed, wherein the downstream processor means, in response to the received message, processes the processed data block in accordance with a second one of the plurality of data processing loop iterations and stores a result of processing the processed data block in the second memory, and wherein the upstream processor means and the downstream processor means each process the data block and the processed data block, respectively, as part of an uninterrupted execution of the first and the second ones of the plurality of data processing loop iterations associated with the commonly-executed function.

In Example 42, the subject matter of Example 41, wherein the downstream processor means receives the processed data block from the upstream processor means via the data interface means while the upstream processor means processes another data block in accordance with a third one of the plurality of data processing loop iterations.

In Example 43, the subject matter of any combination of Examples 41-42, wherein the upstream processor means processes the data block in accordance with the first one of the plurality of data processing loop iterations with zero loop overhead, and wherein the downstream processor means processes the processed data block in accordance with the second one of the plurality of data processing loop iterations with zero loop overhead.

In Example 44, the subject matter of any combination of Examples 41-43, wherein the upstream processor means and the downstream processor means each process respective data blocks in accordance with the plurality of data processing loop iterations without exiting a loop body associated with the commonly-executed function.

In Example 45, the subject matter of any combination of Examples 41-44, wherein the message includes an address of the processed data block stored in the first memory of the upstream processor means.

In Example 46, the subject matter of any combination of Examples 41-45, wherein the downstream processor means receives the processed data block from the upstream processor means via the data interface means by retrieving the processed data block from the first memory of the upstream processor means.

In Example 47, the subject matter of any combination of Examples 41-46, wherein: the upstream processor means transmits the message to the downstream processor indicating that the processing of the data block is completed by storing the message in the FIFO buffer, and the downstream processor means receives the message transmitted by the upstream processor by retrieving the message from the FIFO buffer.

In Example 48, the subject matter of any combination of Examples 41-47, wherein the downstream processor means reads the message from the FIFO buffer and removes the message from the FIFO buffer prior to processing the processed data block in accordance with the second one of the plurality of data processing loop iterations.

An apparatus as shown and described.
A method as shown and described.

Conclusion

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:
1. A processing pipeline, comprising:
a first processor including a first memory; and
a second processor including a second memory, the second processor being operably connected to the first processor via a data interface and being downstream from the first processor in the processing pipeline,
wherein the first processor and the second processor are configured to process data blocks in accordance with a plurality of data processing loop iterations associated with a commonly-executed function, wherein the first processor is configured to process a data block in accordance with a first one of the plurality of data processing loop iterations to provide a processed data block, to store the processed data block in the first memory, and to transmit a message to the second processor indicating that the processed data block has been stored in the first memory, wherein the second processor is configured to, in response to receiving the message, process the processed data block in accordance with a second one of the plurality of data processing loop iterations and to store a result of processing the processed data block in the second memory, and wherein the first processor and the second processor are each configured to process the data block and the processed data block, respectively, as part of an uninterrupted execution of the first and the second ones of the plurality of data processing loop iterations associated with the commonly-executed function.

2. The processing pipeline of claim 1, wherein the second processor is configured to receive the processed data block from the first processor via the data interface while the first processor processes another data block in accordance with a third one of the plurality of data processing loop iterations.

3. The processing pipeline of claim 1, wherein the first processor is configured to process the data block in accordance with the first one of the plurality of data processing loop iterations with zero loop overhead, and wherein the second processor is configured to process the processed data block in accordance with the second one of the plurality of data processing loop iterations with zero loop overhead.

4. The processing pipeline of claim 1, wherein the first processor and the second processor are each configured to process respective data blocks in accordance with the plurality of data processing loop iterations without exiting a loop body associated with the commonly-executed function.

5. The processing pipeline of claim 1, wherein the message includes an address of the processed data block stored in the first memory of the first processor.

6. The processing pipeline of claim 5, wherein the second processor is configured to receive the processed data block from the first processor via the data interface by retrieving the processed data block from the first memory of the first processor.

7. The processing pipeline of claim 1, wherein:

the data interface includes a first-in-first-out (FIFO) buffer, the first processor is configured to transmit the message to the second processor indicating that the processing of the data block is completed by storing the message in the FIFO buffer, and the second processor is configured to receive the message transmitted by the first processor by retrieving the message from the FIFO buffer.

8. The processing pipeline of claim 7, wherein the second processor is configured to read the message from the FIFO buffer and to remove the message from the FIFO buffer prior to processing the processed data block in accordance with the second one of the plurality of data processing loop iterations.

9. A processing pipeline, comprising:

a data interface; and a plurality of processors operably connected to one another and configured to process data blocks in accordance with a plurality of data processing loop iterations associated with a commonly-executed function, the plurality of processors including a producer processor and a consumer processor, the producer processor being configured to provide, via the data interface, data to the consumer processor that is downstream from the producer processor with respect to the processing pipeline, wherein the producer processor is configured to process a data block in accordance with a first one of the plurality of data processing loop iterations to provide a processed data block, to store the processed data block in a first memory, and to transmit a message to the consumer processor indicating that the processed data block has been stored in the first memory, wherein the consumer processor is configured to, in response to receiving the message, process the processed data block in accordance with a second one of the plurality of data processing loop iterations and to store a result of processing the processed data block in a second memory, wherein the producer processor and the consumer processor are each configured to process the data block and the processed data block, respectively, as part of an uninterrupted execution of the first and the second ones of the plurality of data processing loop iterations associated with the commonly-executed function.

10. The processing pipeline of claim 9, wherein the consumer processor is configured to receive the processed data block from the producer processor via the data interface while the producer processor processes another data block in accordance with a third one of the plurality of data processing loop iterations.

11. The processing pipeline of claim 9, wherein the producer processor is configured to process the data block in accordance with the first one of the plurality of data processing loop iterations with zero loop overhead, and wherein the consumer processor is configured to process the processed data block in accordance with the second one of the plurality of data processing loop iterations with zero loop overhead.

12. The processing pipeline of claim 9, wherein the producer processor and the consumer processor are each configured to process respective data blocks in accordance with the plurality of data processing loop iterations without exiting a loop body associated with the commonly-executed function.

13. The processing pipeline of claim 9, wherein the message includes an address of the processed data block stored in the first memory of the producer processor.

14. The processing pipeline of claim 13, wherein the consumer processor is configured to receive the processed data block from the producer processor via the data interface by retrieving the processed data block from the first memory of the producer processor.

15. The processing pipeline of claim 9, wherein:

the data interface includes a first-in-first-out (FIFO) buffer, the producer processor is configured to transmit the message to the consumer processor indicating that the processing of the data block is completed by storing the message in the FIFO buffer, and the consumer processor is configured to receive the message transmitted by the producer processor by retrieving the message from the FIFO buffer.

16. The processing pipeline of claim 15, wherein the consumer processor is configured to read the message from the FIFO buffer and to remove the message from the FIFO buffer prior to processing the processed data block in accordance with the second one of the plurality of data processing loop iterations.

17. A processing pipeline, comprising:
an upstream processor including a first memory; and
a downstream processor including a second memory, the upstream processor and the downstream processor each being operably connected to a first-in-first-out (FIFO) buffer;
wherein the upstream processor and the downstream processor are configured to process data blocks in accordance with a plurality of data processing loop iterations associated with a commonly-executed function,
wherein the upstream processor is configured to process a data block in accordance with a first one of the plurality of data processing loop iterations to provide a processed data block, to store the processed data block in the first memory, and to transmit a message to the downstream processor indicating that the processing of the processed data block has been completed,
wherein the downstream processor is configured to, in response to receiving the message, process the processed data block in accordance with a second one of the plurality of data processing loop iterations and to store a result of processing the processed data block in the second memory, and
wherein the upstream processor and the downstream processor are each configured to process the data block and the processed data block, respectively, as part of an uninterrupted execution of the first and the second ones of the plurality of data processing loop iterations associated with the commonly-executed function.

18. The processing pipeline of claim 17, wherein the downstream processor is configured to receive the processed data block from the upstream processor via the data interface while the upstream processor processes another data block in accordance with a third one of the plurality of data processing loop iterations.

19. The processing pipeline of claim 17, wherein the upstream processor is configured to process the data block in accordance with the first one of the plurality of data processing loop iterations with zero loop overhead, and
wherein the downstream processor is configured to process the processed data block in accordance with the second one of the plurality of data processing loop iterations with zero loop overhead.

20. The processing pipeline of claim 17, wherein the upstream processor and the downstream processor are each configured to process respective data blocks in accordance with the plurality of data processing loop iterations without exiting a loop body associated with the commonly-executed function.

21. The processing pipeline of claim 17, wherein the message includes an address of the processed data block stored in the first memory of the upstream processor.

22. The processing pipeline of claim 21, wherein the downstream processor is configured to receive the processed data block from the upstream processor via the data interface by retrieving the processed data block from the first memory of the upstream processor.

23. The processing pipeline of claim 21, wherein:
the upstream processor is configured to transmit the message to the downstream processor indicating that the processing of the data block is completed by storing the message in the FIFO buffer, and
the downstream processor is configured to receive the message transmitted by the upstream processor by retrieving the message from the FIFO buffer.

24. The processing pipeline of claim 23, wherein the downstream processor is configured to read the message from the FIFO buffer and to remove the message from the FIFO buffer prior to processing the processed data block in accordance with the second one of the plurality of data processing loop iterations.

* * * * *